US012774766B2

(12) United States Patent
Hou et al.

(10) Patent No.: US 12,774,766 B2
(45) Date of Patent: Oct. 27, 2026

(54) ASSEMBLY OF METAL FLANGE AND RESIN PIPE AND METHOD OF MANUFACTURING ASSEMBLY

(71) Applicant: THE YOKOHAMA RUBBER CO., LTD., Hiratsuka (JP)

(72) Inventors: Gang Hou, Hiratsuka (JP); Nobuaki Kuribayashi, Hiratsuka (JP)

(73) Assignee: The Yokohama Rubbar Co., Ltd., Kanagawa (JP)

( * ) Notice: Subject to any disclaimer, the term of this patent is extended or adjusted under 35 U.S.C. 154(b) by 357 days.

(21) Appl. No.: 18/691,674

(22) PCT Filed: Jun. 30, 2022

(86) PCT No.: PCT/JP2022/026295
§ 371 (c)(1),
(2) Date: Mar. 13, 2024

(87) PCT Pub. No.: WO2023/058279
PCT Pub. Date: Apr. 13, 2023

(65) Prior Publication Data

US 2024/0377005 A1 Nov. 14, 2024

(30) Foreign Application Priority Data

Oct. 7, 2021 (JP) ................................. 2021-165568

(51) Int. Cl.
*F16L 23/024* (2006.01)
*B29C 49/06* (2006.01)
(Continued)

(52) U.S. Cl.
CPC ............ *F16L 23/024* (2013.01); *B29C 49/06* (2013.01); *B29C 49/20* (2013.01); *B29C 2049/2017* (2013.01); *B29L 2023/22* (2013.01)

(58) Field of Classification Search
CPC ................... F16L 23/024; B29C 49/06; B29C 2045/1719; B29C 45/1704
See application file for complete search history.

(56) References Cited

U.S. PATENT DOCUMENTS

| | | | | |
|---|---|---|---|---|
| 11,453,150 | B2 | 9/2022 | Kuribayashi et al. | |
| 2010/0295296 | A1* | 11/2010 | Kawamata | F16L 23/024 29/505 |
| 2021/0354350 | A1* | 11/2021 | Kuribayashi | B29C 45/1459 |

FOREIGN PATENT DOCUMENTS

| | | |
|---|---|---|
| AU | 85 990/82 A | 2/1983 |
| CN | 208185694 U | 12/2018 |

(Continued)

*Primary Examiner* — Jason K Niesz
(74) *Attorney, Agent, or Firm* — Carrier, Shende & Associates P.C.; Joseph P. Carrier; Fulchand P. Shende

(57) ABSTRACT

A metal flange having unevenness on a surface of an insertion hole is disposed in an insert portion in a cavity body of a mold. A resin pipe is formed by curing molten resin injected into a cavity. The metal flange is fitted to a fixing groove continuous over an entire circumference of an outer circumferential surface of the pipe in a circumferential direction. An outer circumferential surface of the fixing groove enters the unevenness on the surface of the insertion hole. A circumferential rib is formed on at least one side of both ends of the flange in a longitudinal direction of the resin pipe, abuts on an end surface of the flange, has a diameter larger than an outer diameter of the pipe, and is continuous over the entire circumference of the outer circumferential surface of the pipe in the circumferential direction.

6 Claims, 12 Drawing Sheets

(51) Int. Cl.
*B29C 49/20* (2006.01)
*B29L 23/00* (2006.01)

(56) References Cited

FOREIGN PATENT DOCUMENTS

| | | | |
|---|---|---|---|
| JP | H03-39235 | A | 2/1991 |
| JP | H07-80922 | A | 3/1995 |
| JP | 2007-078089 | A | 3/2007 |
| JP | 2021-088088 | A | 6/2021 |
| KR | 100688676 | B1 | 3/2007 |
| KR | 20120059028 | A | 6/2012 |
| KR | 101595209 | B1 | 2/2016 |
| KR | 20190014832 | A | 2/2019 |
| WO | 2020/110369 | A1 | 6/2020 |

* cited by examiner

ASSEMBLY OF METAL FLANGE AND RESIN PIPE AND METHOD OF MANUFACTURING ASSEMBLY

TECHNICAL FIELD

The present invention relates to an assembly of a metal flange and a resin pipe and a method of manufacturing the assembly, and particularly relates to an assembly that allows for fixing the metal flange to the resin pipe at a predetermined position without displacement and providing improved durability of the resin pipe at a fixed portion of both and a method of manufacturing the assembly.

BACKGROUND ART

Resin pipes, which are lighter than metal pipes, have been used for various applications. For example, the resin pipe is attached to a target device or the like via an externally fitted flange (see, for example, Patent Document 1). Although the flange may be made of resin to reduce the weight, the use of a metal flange is necessary to ensure sufficient durability under use conditions in which a comparatively large load continuously acts.

Since the resin pipe easily deforms compared with the metal flange, a gap is formed at fixed portions of both over time, and the metal flange is possibly displaced from a predetermined position. In addition, an excessive stress is generated in the resin pipe at the fixed portion of both, and the resin pipe is possibly easily damaged. Therefore, there is room for improvement to fix the metal flange to the resin pipe at a predetermined position without displacement and improve the durability of the resin pipe at the fixed portion of both.

CITATION LIST

Patent Document

Patent Document 1: JP 7-80922 A

SUMMARY OF INVENTION

Technical Problem

An object of the present invention is to provide an assembly of a metal flange and a resin pipe that allows for fixing the metal flange to the resin pipe at a predetermined position without displacement and providing improved durability of the resin pipe at a fixed portion of both and a method of manufacturing the assembly.

Solution to Problem

To achieve the object described above, in an assembly of a metal flange and a resin pipe according to an embodiment of the present invention, the metal flange may be externally fitted to and integrated with the resin pipe. The metal flange may be fitted in a fixing groove continuous over an entire circumference of an outer circumferential surface of the resin pipe in a circumferential direction. Unevenness may be formed on a surface of an insertion hole of the metal flange into which the resin pipe is inserted. An outer circumferential surface of the fixing groove may enter the unevenness. A circumferential rib may be formed on at least one side of both ends of the metal flange in a longitudinal direction of the resin pipe, abut on an end surface of the metal flange, have a diameter larger than an outer diameter of the resin pipe, and be continuous over the entire circumference of the outer circumferential surface of the resin pipe in the circumferential direction.

In a method of manufacturing an assembly of a metal flange and a resin pipe according to an embodiment of the present invention, the metal flange may be externally fitted to and integrated with the resin pipe. The method may include: forming unevenness on a surface of an insertion hole of the metal flange into which the resin pipe is inserted; disposing the metal flange in an insert portion provided in a cavity body of a mold for forming the resin pipe; forming a rib forming cavity on at least one side of both ends of the insert portion in an extension direction of the cavity body, the rib forming cavity being connected to the insert portion, having a diameter larger than an outer diameter of the cavity body, and being continuous over an entire circumference of an outer circumferential surface of the cavity body in a circumferential direction; injecting molten resin into the cavity body and the rib forming cavity in a state where the mold is clamped to form the resin pipe by curing the molten resin; fitting the metal flange into a fixing groove continuous over the entire circumference of the outer circumferential surface of the resin pipe in the circumferential direction; causing an outer circumferential surface of the fixing groove to enter the unevenness on the surface of the insertion hole; and forming a circumferential rib on at least one side of both ends of the metal flange in a longitudinal direction of the resin pipe, the circumferential rib abutting on an end surface of the metal flange, having a diameter larger than an outer diameter of the resin pipe, and being continuous over the entire circumference of the outer circumferential surface of the resin pipe in the circumferential direction.

Advantageous Effects of Invention

According to an embodiment of the present invention, a structure in which the metal flange is fitted into the fixing groove continuous over the entire circumference of the outer circumferential surface of the resin pipe in the circumferential direction and the outer circumferential surface of the fixing groove enters the unevenness on the surface of the insertion hole of the metal flange is employed, which is advantageous for fixing the metal flange to the resin pipe at a predetermined position without displacement. Further, a structure in which the circumferential rib is provided on at least one side of both ends of the metal flange in the longitudinal direction of the resin pipe, abuts on the end surface of the metal flange, has a diameter larger than the outer diameter of the resin pipe, and is continuous over the entire circumference of the outer circumferential surface of the resin pipe in the circumferential direction is employed. Accordingly, stress generated on the resin pipe at a fixed portion of both is reduced by the circumferential rib. As a result, it is advantageous to improve the durability of the resin pipe at the fixed portion of both.

DESCRIPTION OF EMBODIMENTS

Figure 1:
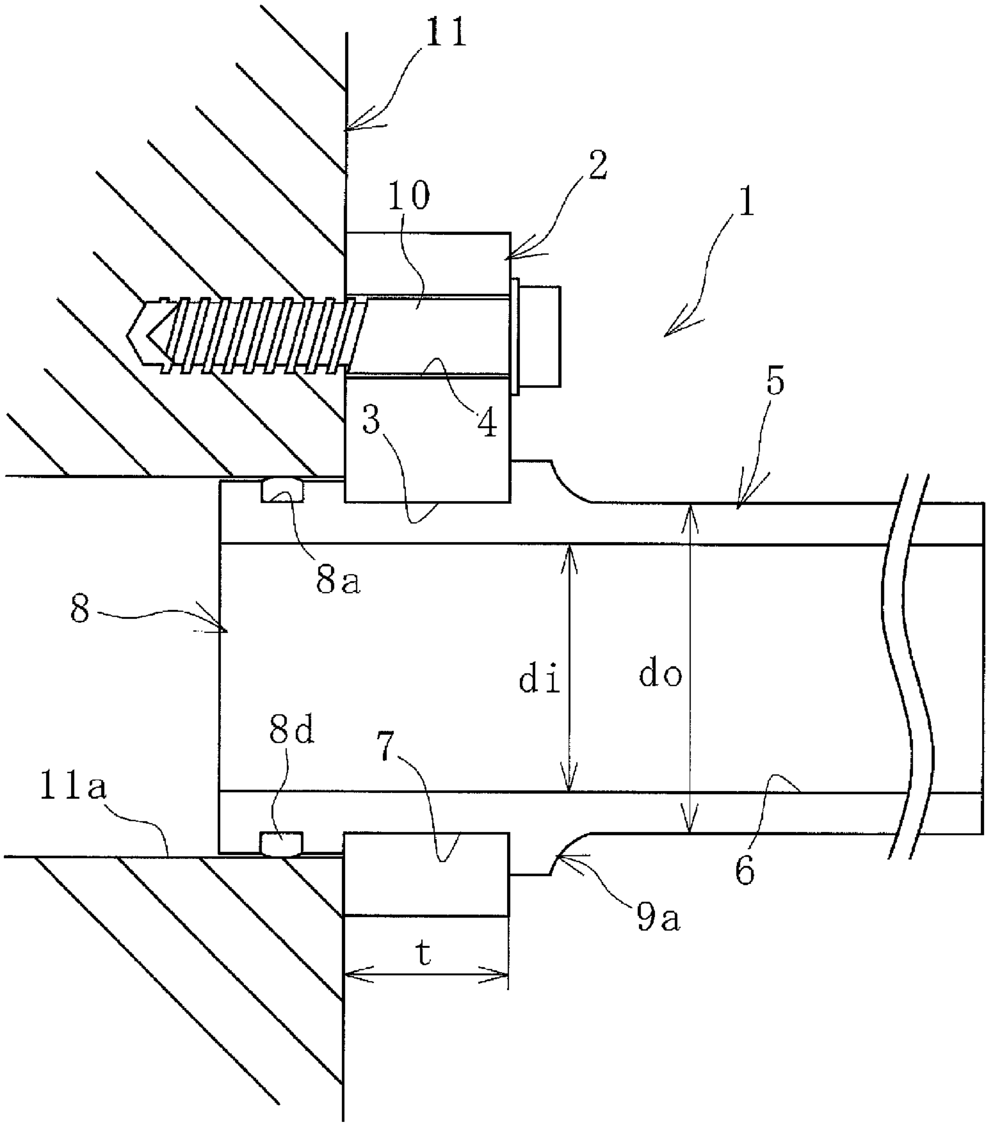
FIG. 1 is an explanatory diagram exemplifying a use state of an assembly of an embodiment of the present invention in a longitudinal cross-sectional view.
Figure 2:
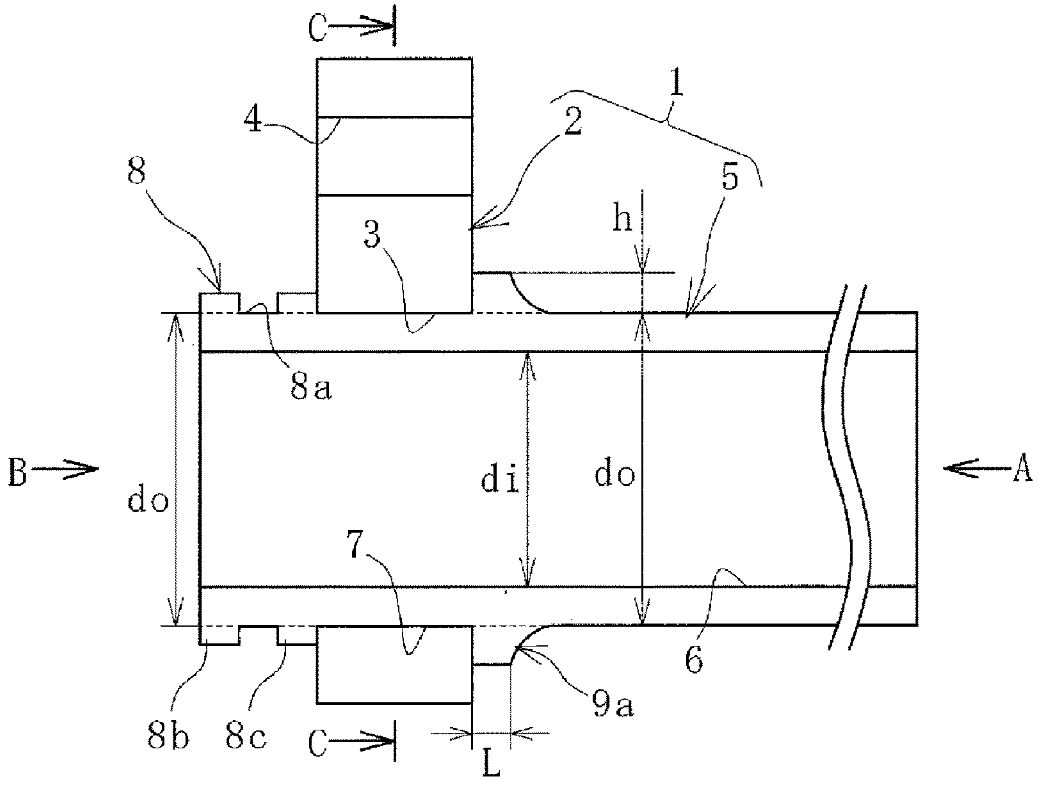
FIG. 2 is an explanatory diagram exemplifying the assembly of FIG. 1 in a longitudinal cross-sectional view.
Figure 3:
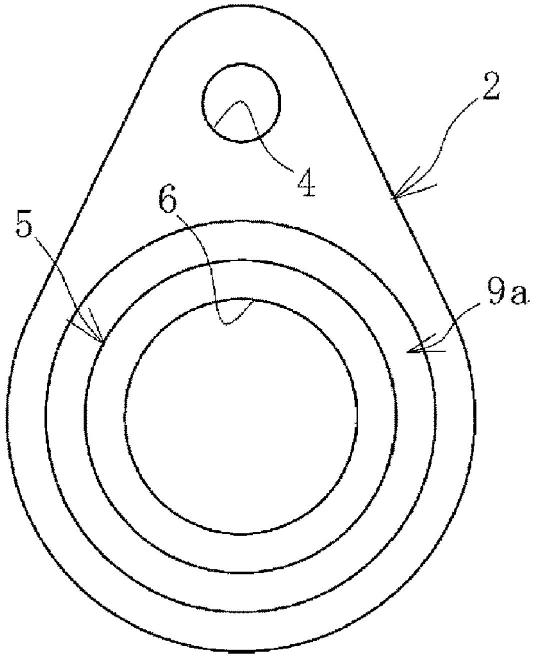
FIG. 3 is a view in the direction of arrow A in FIG. 2.
Figure 4:
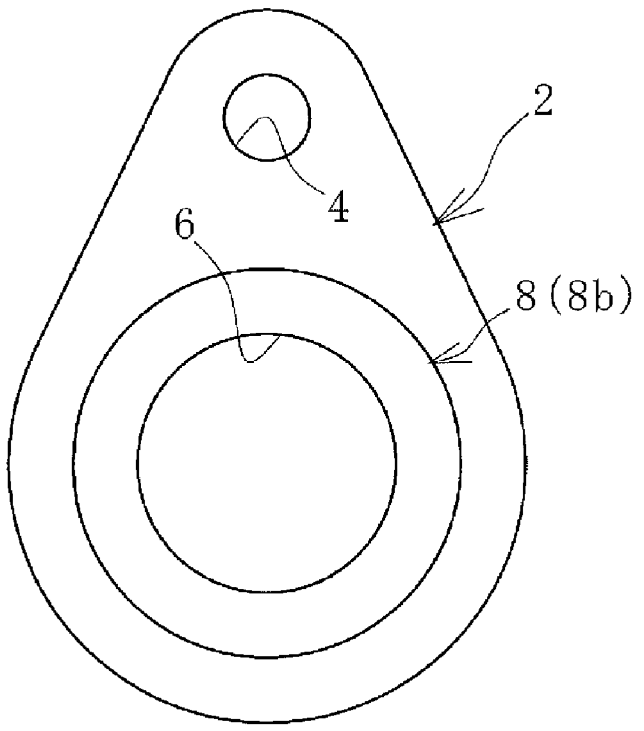
FIG. 4 is a view in the direction of arrow B in FIG. 2.

Hereinafter, an assembly of a metal flange and a resin pipe and a method of manufacturing the assembly according to an embodiment of the present invention will be described based on embodiments illustrated in the drawings.

As exemplified in FIGS. 1 to 5, an embodiment of an assembly 1 manufactured by the embodiment of the present invention is formed by externally fitting a metal flange 2 to a resin pipe 5 such that both are integrated. In the embodiment, the resin pipe 5 is a straight pipe having an outer diameter do and an inner diameter di, but there may be a case where the resin pipe 5 is a bent pipe. The outer diameter do is, for example, about 6 mm or more and 150 mm or less, and the inner diameter di is, for example, about 4 mm or more and 146 mm or less.

Both end portions of the resin pipe 5 in a longitudinal direction are connected to various devices, joint parts, and the like. In the embodiment, as exemplified in FIG. 1, the other longitudinal end portion of the resin pipe 5 is an insertion portion 8 inserted into a flow path 11*a* of a target device 11. A seal member 8*d* disposed in the insertion portion 8 abuts on an inner circumferential surface of the flow path 11*a* to ensure a sealing property between the resin pipe 5 and the flow path 11*a*.

One end surface of the metal flange 2 abuts on an opposed surface of the target device 11, and a fixing bolt 10 passing through a mounting hole 4 of the metal flange 2 is screwed into a bolt hole of the target device 11. Thus, the assembly 1 is connected and fixed to the target device 11.

The structure of the assembly 1 will be described in detail below.

The metal flange 2 includes an insertion hole 3 into which the resin pipe 5 is inserted and the mounting hole 4. Although various metals can be used as the material of the metal flange 2, aluminum or an aluminum alloy is preferable for weight reduction. A thickness t of the metal flange 2 is, for example, about 70% or more and 100% or less of the outer diameter do of the resin pipe 5.

Figure 5:
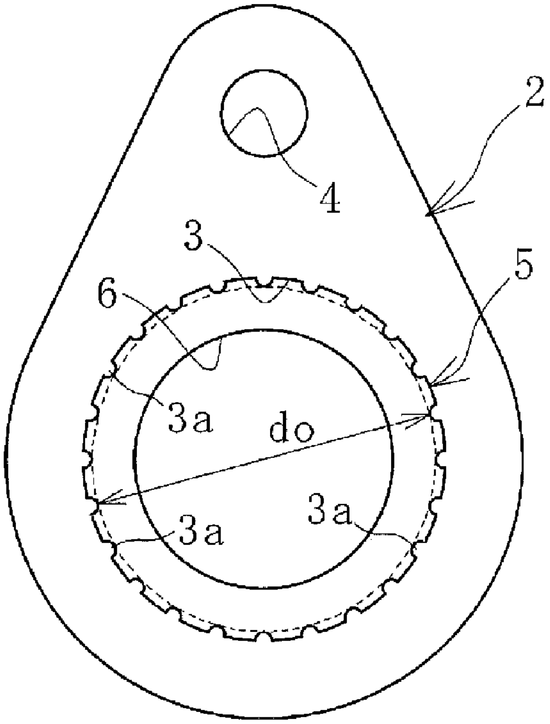
FIG. 5 is a cross-sectional view taken along C-C in FIG. 2.
Figure 6:
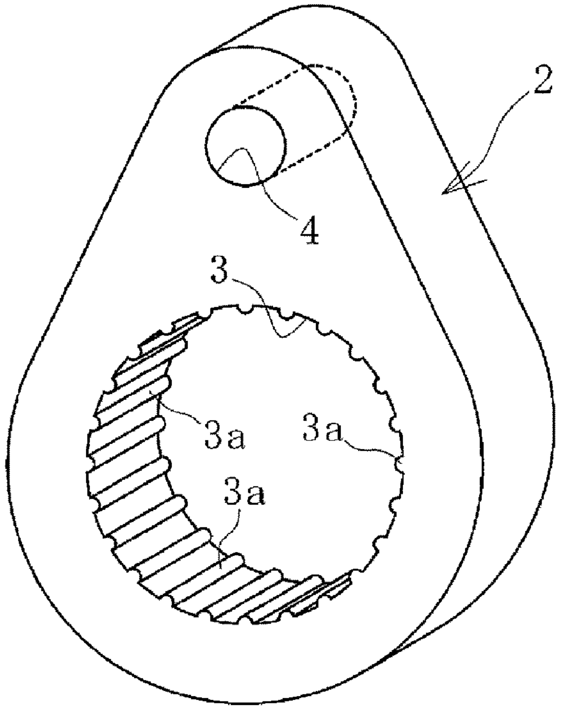
FIG. 6 is an explanatory diagram exemplifying a metal flange of FIG. 2 in a perspective view.

As exemplified in FIG. 5, the surface of the insertion hole 3 includes a large number of projections 3*a* and is unevenly formed. As exemplified in FIG. 6, each of the projections 3*a* extends linearly in parallel with the longitudinal direction of the resin pipe 5. The respective projections 3*a* are preferably disposed at regular intervals in a circumferential direction. The number of the projections 3*a* and a projection amount of the projection 3*a* in a radial direction of the insertion hole 3 are determined as appropriate. For example, the number of the projections 3*a* is about 8 pieces or more and 32 pieces or less, and the projection amount is about several mm.

Figure 7:
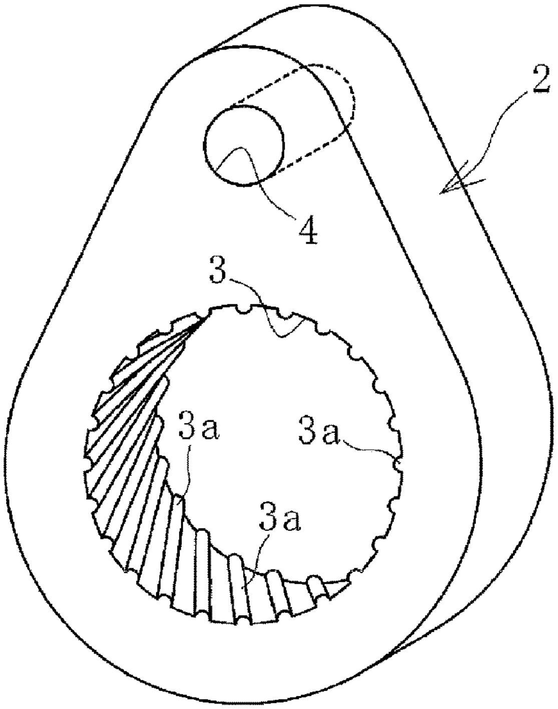
FIG. 7 is an explanatory diagram exemplifying a modified example of a metal flange in a perspective view.

As in the metal flange 2 exemplified in FIG. 7, a specification in which the respective projections 3*a* are inclined with respect to the longitudinal direction of the resin pipe 5 to extend spirally can be employed. Alternatively, the projections 3*a* extending in the circumferential direction of the insertion hole 3 can be provided. To prevent the metal flange 2 externally fitted to the resin pipe 5 from being rotationally displaced about the resin pipe 5, at least one projection 3*a* (the projection 3*a* not parallel to the circumferential direction of the resin pipe 5) extending in the longitudinal direction of the resin pipe 5 only needs to be provided on the surface of the insertion hole 3.

The resin pipe 5 includes a pipe passage 6 passing through and extending in the longitudinal direction. As the resin forming the resin pipe 5, various known resins, such as nylon resin (66 nylon or the like), polypropylene, and ABS resin, are used. The type (specification) of the resin used for the resin pipe 5 is determined based on performance required for the resin pipe 5. For example, resin having excellent durability against a fluid flowing through the pipe passage 6 and durability against external impact, wear, ultraviolet rays, and the like is used.

In the case of the resin pipe 5 required to have high pressure resistance, short fiber (for example, glass fiber or carbon fiber) is mixed with the resin at a predetermined percentage (for example, 30% parts by mass or more and 40% parts by mass or less per 100 parts by mass of the resin) for reinforcement. The size of the short fibers is, for example, about 0.001 mm or more and 1.0 mm or less in an outer diameter and about 0.01 mm or more and 10 mm or less in a length.

In the insertion portion 8, enlarged-diameter portions 8*b* and 8*c* continuous over the entire circumference of the outer circumferential surface of the resin pipe 5 in the circumferential direction are disposed to be separated in the longitudinal direction of the resin pipe 5. A portion between the respective enlarged-diameter portions 8*b* and 8*c* is a seal groove 8*a* continuous over the entire circumference of the outer circumferential surface of the resin pipe 5 in the circumferential direction. The seal member 8*d*, such as an O-ring, made of rubber or elastomer is fitted into the seal groove 8*a*.

Although a groove bottom of the seal groove 8*a* can be located on the inner circumferential side of the outer diameter do, the groove bottom is preferably located at a position same as the outer diameter do or on the outer circumferential side of the outer diameter do to ensure a thickness of a circumferential wall of the resin pipe 5. When the groove bottom of the seal groove 8*a* is located on the inner circumferential side of the outer diameter do, the outer circumferential surfaces of the respective enlarged-diameter portions 8*b* and 8*c* are located on the position equivalent to the outer diameter do in some cases. When the groove bottom is located on the position equivalent to the outer diameter do or on the outer circumferential side of the outer diameter do, the outer circumferential surfaces of the respective enlarged-diameter portions 8*b* and 8*c* are located on the outer circumferential side of the outer diameter do.

The resin pipe 5 includes a fixing groove 7 on the outer circumferential surface continuous over the entire circumference in the circumferential direction. The metal flange 2 is fitted to the fixing groove 7. The groove bottom of the fixing groove 7 can be located on the inner circumferential side of the outer diameter do, but is preferably located at the position same as the outer diameter do or on the outer circumferential side of the outer diameter do to ensure the thickness of the circumferential wall of the resin pipe 5. As exemplified in FIG. 5, the outer circumferential surface of the fixing groove 7 enters the unevenness formed on the surface of the insertion hole 3.

A circumferential rib 9*a* is provided at a position separated from one enlarged-diameter portion 8*c* in the longitudinal direction of the resin pipe 5. The circumferential rib 9*a* is continuous over the entire circumference of the outer circumferential surface of the resin pipe 5 in the circumferential direction. The fixing groove 7 is formed between one enlarged-diameter portion 8*c* and the circumferential rib 9*a*.

That is, on one side of both ends of the metal flange 2 in the longitudinal direction of the resin pipe 5, there is provided the annular circumferential rib 9*a* projecting toward the outer circumferential side from the outer diameter do of the resin pipe 5. The circumferential rib 9*a* abuts on the surface of one end surface of the metal flange 2 over the entire circumference in the circumferential direction.

An effective length L (a minimum length with respect to the longitudinal direction of the resin pipe 5) of the circumferential rib 9*a* is preferably 2 mm or more, and is about 2 mm or more and 20 mm or less. In addition, a projection amount h of the circumferential rib 9*a* (a projection amount from the outer circumferential surface of the outer diameter do to the outer circumferential side) is preferably 2.0 mm or more and, for example, about 2.0 mm or more and 10.0 mm or less.

In the embodiment, the enlarged-diameter portion 8*c* is provided on the other side of both ends of the metal flange 2 in the longitudinal direction of the resin pipe 5. The enlarged-diameter portion 8*c* projects toward the outer circumferential side from the outer diameter do of the resin pipe 5, abuts on the surface of the other end surface of the metal flange 2, and is continuous over the entire circumference of the outer circumferential surface of the resin pipe 5 in the circumferential direction. Therefore, the enlarged-diameter portion 8*c* also functions as the circumferential rib 9*a*. However, the projection amount of the enlarged-diameter portion 8*c* from the outer circumferential surface of the outer diameter do toward the outer circumferential side is small and smaller than the projection amount h. The circumferential rib 9*a* only needs to be disposed on at least one side of both ends of the metal flange 2 in the longitudinal direction of the resin pipe 5, and a structure having the circumferential rib 9*a* only on one side can be employed.

Figure 8:
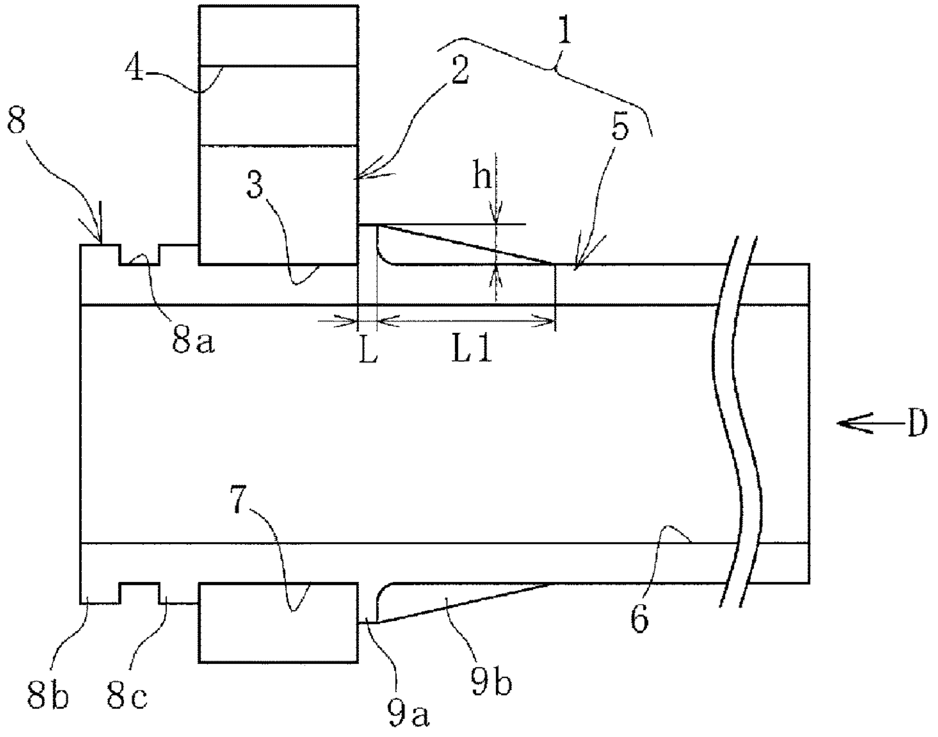
FIG. 8 is an explanatory diagram exemplifying an assembly according to another embodiment in a longitudinal cross-sectional view.
Figure 9:
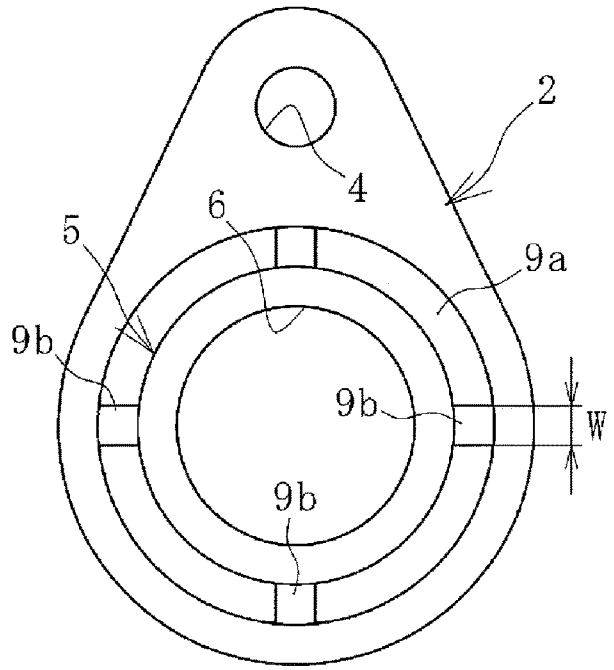
FIG. 9 is a view in the direction of arrow D in FIG. 8.

As exemplified in FIGS. 8 and 9, a specification in which a longitudinal rib 9*b* connected to the circumferential rib 9*a* and extending to one side in the longitudinal direction of the resin pipe 5 is provided in addition to the circumferential rib 9*a* can be employed. At least the three longitudinal ribs 9*b* are disposed to be separated at regular intervals in the circumferential direction of the resin pipe 5. For example, the 4 or more and 12 or less longitudinal ribs 9*b* are disposed at regular intervals in the circumferential direction.

The respective longitudinal ribs 9*b* are set to have substantially the same specifications. A length L1 of the longitudinal rib 9*b* is, for example, about 2.0 mm or more and 50.0 mm or less. The projection amount h of the longitudinal rib 9*b* from the outer diameter do is preferably 2 mm or more and may be equal to or less than the projection amount h of the circumferential rib 9*a*. A width W of the longitudinal rib 9*b* is, for example, about 2.0 mm or more and 30.0 mm or less.

The lateral cross-sectional shape of the longitudinal rib 9*b* is not limited to the quadrangular shape as exemplified in FIG. 9, but any polygonal shape including a semi-circular shape, a triangular shape, and the like can be employed. The longitudinal rib 9*b* having a lateral cross-sectional shape with no corner portion is advantageous to provide the improved durability of the longitudinal rib 9*b*.

In the embodiment, the longitudinal rib 9*b* has a substantially triangular shape inclined from the outer edge of the circumferential rib 9*a* toward the outer circumferential surface of the resin pipe 5 in a longitudinal cross-sectional view. However, the longitudinal rib 9*b* can have another shape, such as a quadrangular shape. To obtain a reinforcing effect for the resin pipe 5 while reducing the weight of the assembly 1, the longitudinal rib 9*b* having a substantially triangular shape in a longitudinal cross-sectional view is preferably employed.

Hereinafter, an example of a procedure of a manufacturing method of manufacturing the assembly 1 of the embodiment of the present invention will be described.

Figure 10:
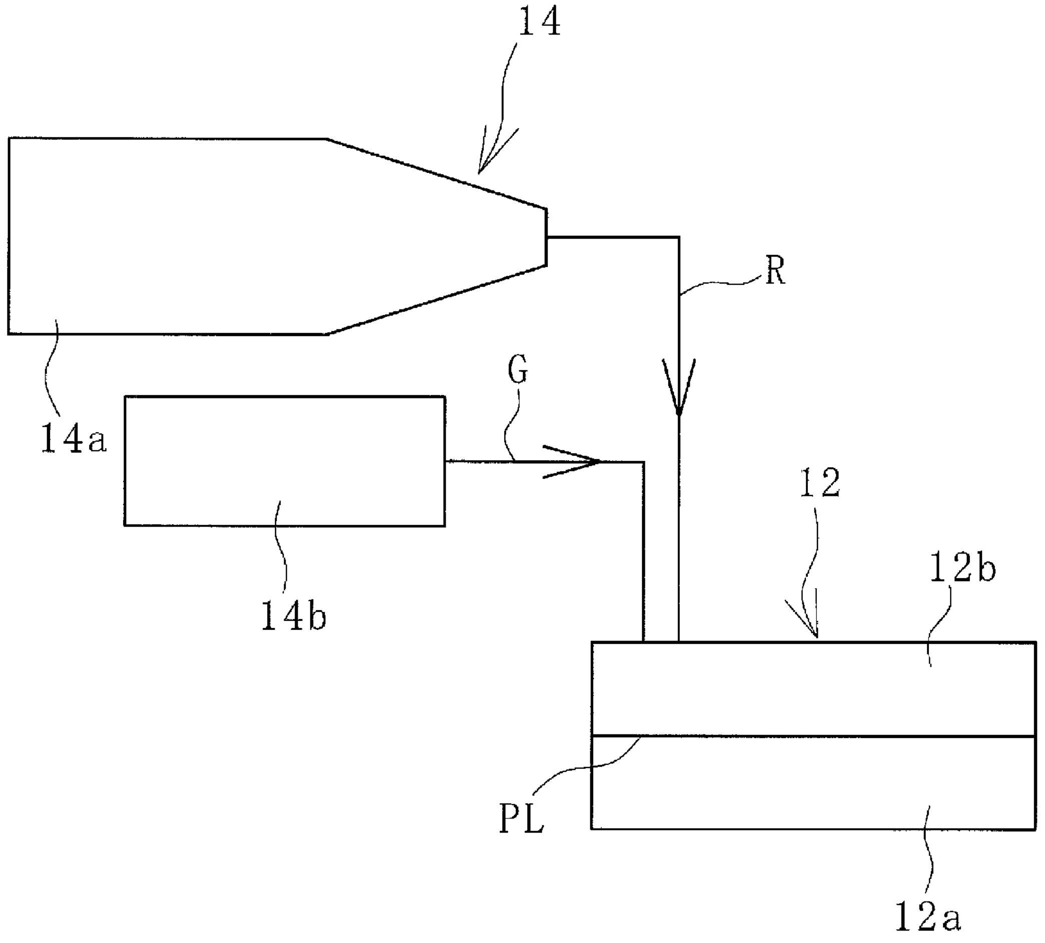
FIG. 10 is an explanatory diagram exemplifying a forming device that manufactures the assembly.

To manufacture the assembly 1 exemplified in FIGS. 8 and 9, a forming device 14 exemplified in FIG. 10 is used. The forming device 14 includes a cylinder 14*a* that injects molten resin R into a mold 12 (cavity 13) and an assist gas injection unit 14*b* that injects an assist gas G into the mold 12 (cavity 13).

In the embodiment, the mold 12 is constituted of one mold 12*a* and the other mold 12*b* assembled to one another. The mutual molds 12*a* and 12*b* are bonded and separated with a parting line PL as a boundary. The mold 12 is not limited to such a two split type, and various known types can be used.

Figure 11:
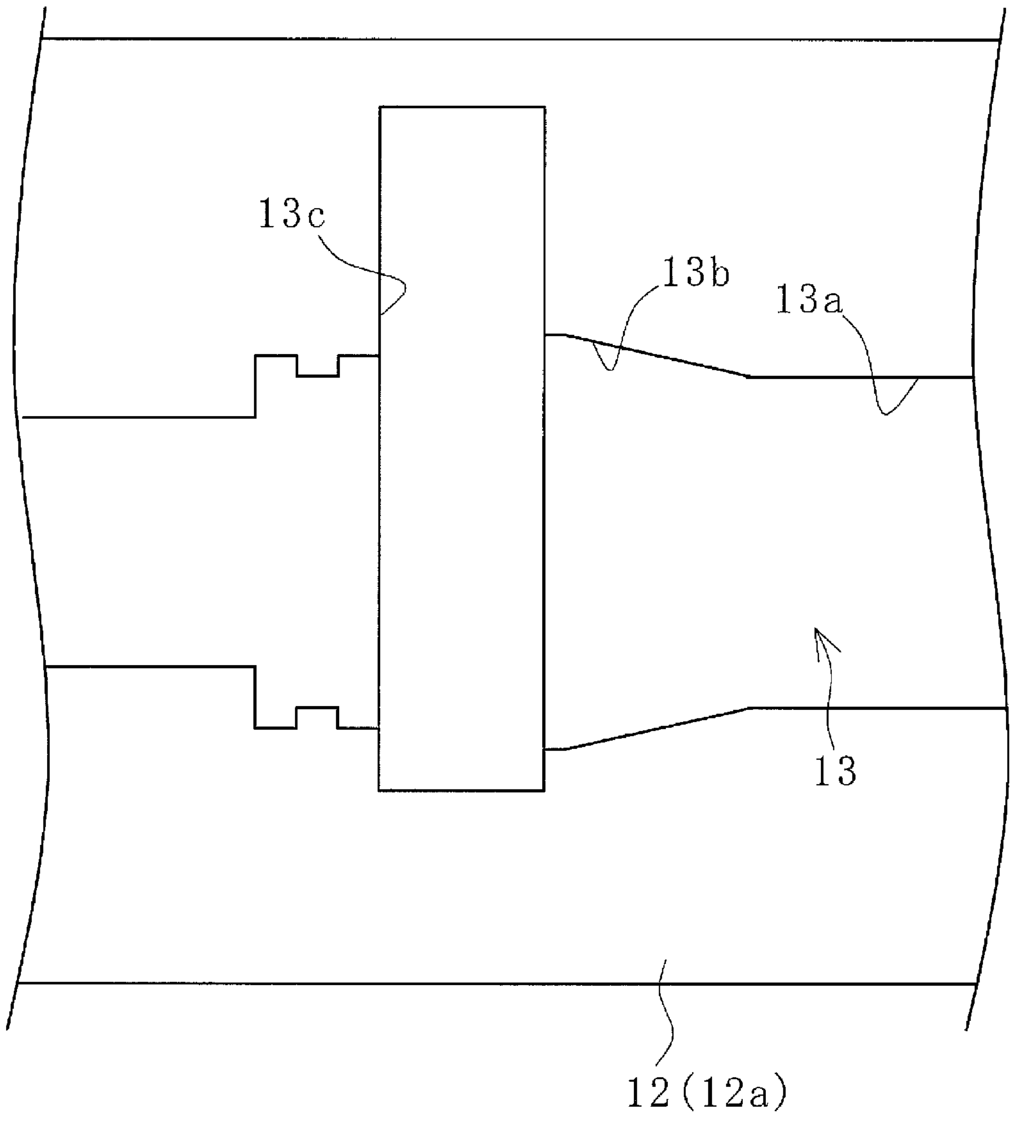
FIG. 11 is an explanatory diagram exemplifying one mold of FIG. 10 in a plan view.

As exemplified in FIG. 11, in the mold 12, the cavity 13, which is a hollow, is formed, and a discharge portion of the assist gas G injected into the cavity 13 is also formed. To describe the cavity 13 in detail, in the mold 12 (12*a*, 12*b*), a cavity body 13*a* for forming the resin pipe 5, a rib forming cavity 13*b* for forming the circumferential rib 9*a* and the longitudinal rib 9*b*, and an insert portion 13*c* for disposing the metal flange 2 are formed. The rib forming cavity 13*b* is formed to be connected to the insert portion 13*c*, has a diameter larger than the outer diameter of the cavity body 13*a*, and is continuous over the entire circumference of the outer circumferential surface of the cavity body 13*a* in the circumferential direction.

The molten rein R filled in the rib forming cavity 13*b* is cured to form the circumferential rib 9*a* and the longitudinal rib 9*b*. Therefore, when the circumferential ribs 9*a* are formed on the respective sides of both end surfaces of the metal flange 2, the rib forming cavities 13*b* are formed on the respective sides at both ends of the insert portion 13*c* in the extension direction of the cavity body 13*a*. When the circumferential rib 9*a* is formed only on one side of both end surfaces of the metal flange 2, the rib forming cavity 13*b* is formed on only one side of the insert portion 13*c* in the extension direction of the cavity body 13*a*.

The projections 3*a* are provided on the surface of the insertion hole 3 of the metal flange 2 to form the surface unevenly. The projections 3*a* may be provided by machining or manual work.

Figure 12:
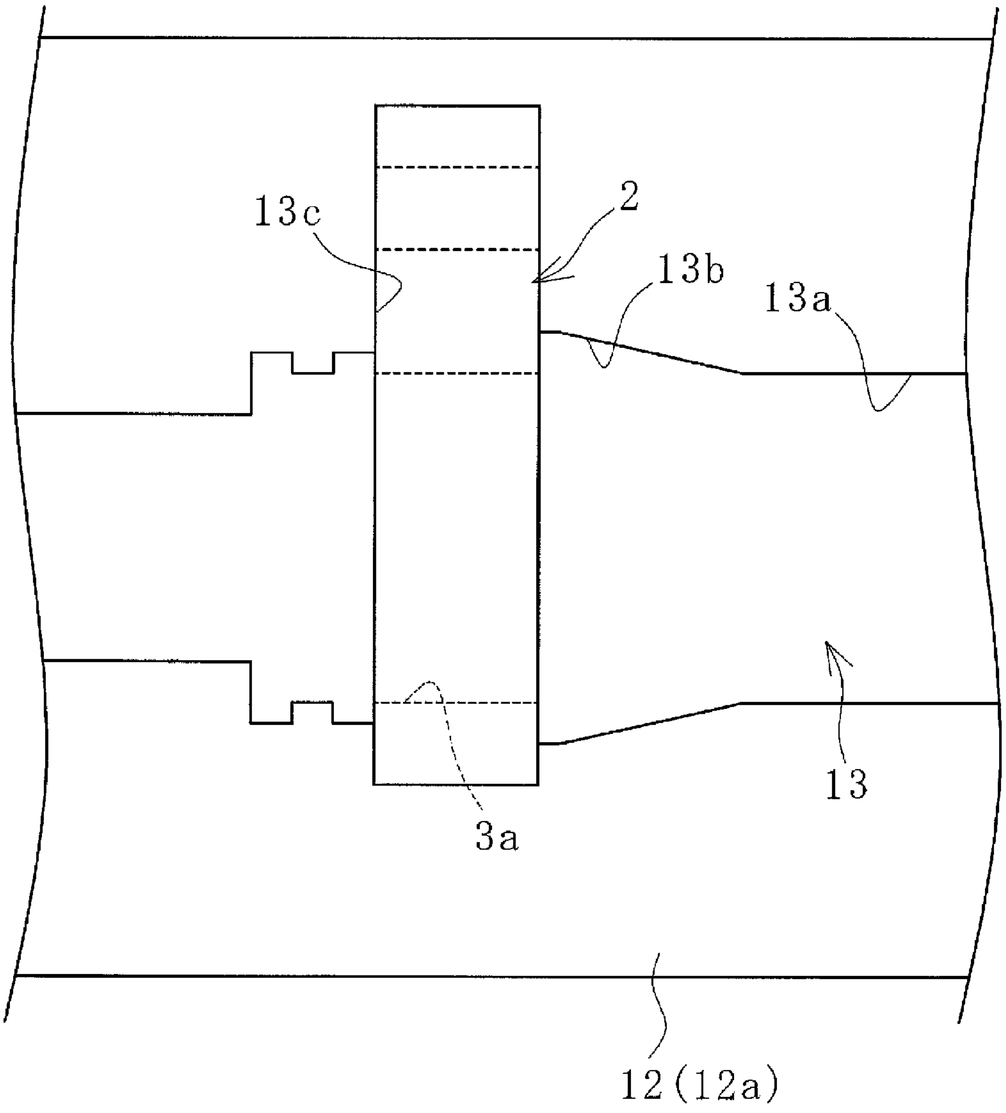
FIG. 12 is an explanatory view exemplifying a state in which the metal flange is disposed in an insert portion of FIG. 11.
Figure 13:
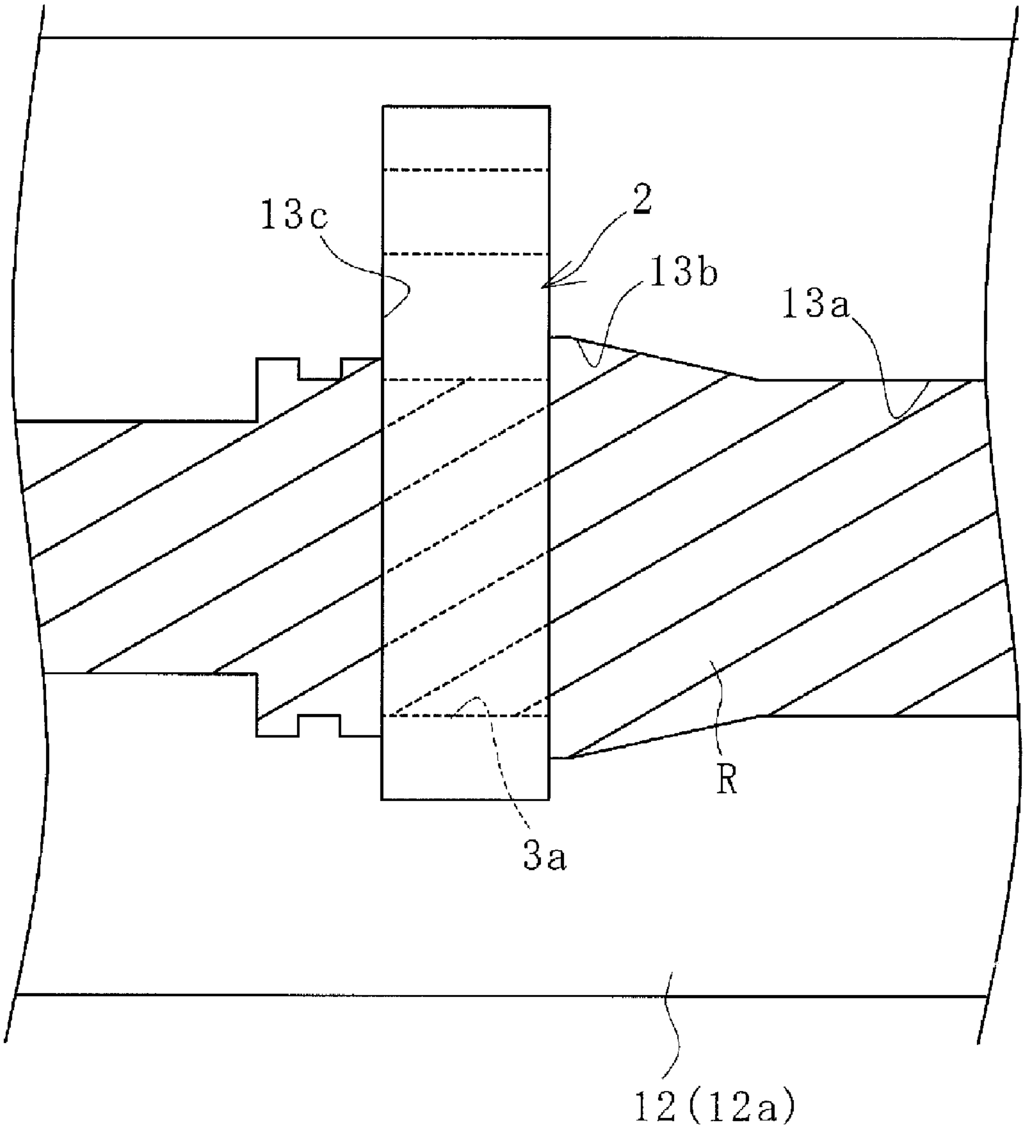
FIG. 13 is an explanatory diagram exemplifying a state in which molds of FIG. 12 are clamped and then molten resin is injected into a cavity.

Next, as exemplified in FIG. 12, after the metal flange 2 is disposed in the insert portion 13*c*, the mutual molds 12*a* and 12*b* are assembled to clamp the mold 12. Then, the molten resin R is injected from the cylinder 14*a* to fill the cavity 13 (the cavity body 13*a* and the rib forming cavity 13*b*) with the molten resin R as exemplified in FIG. 13.

Figure 14:
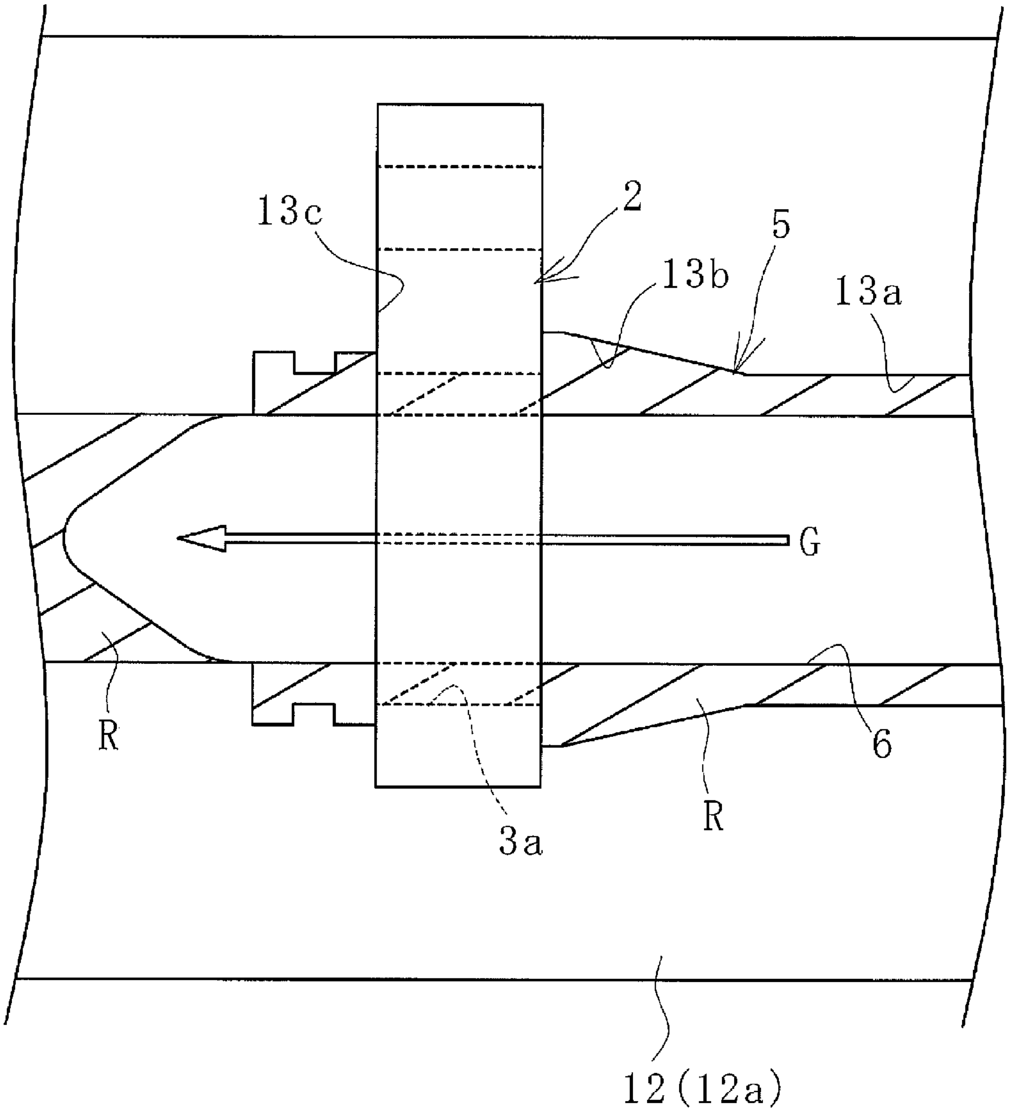
FIG. 14 is an explanatory diagram exemplifying a state in which assist gas is injected into the molten resin of FIG. 13.

In the embodiment, as exemplified in FIG. 14, the assist gas G, such as nitrogen gas, is injected at a predetermined high pressure into the cavity body 13*a* filled with the molten resin R and is caused to pass through in the extension direction of the cavity body 13*a*. By the assist gas G passing through the cavity body 13*a*, excess molten resin is discharged from the cavity body 13*a* to form the pipe passage 6.

Thereafter, the molten resin R remaining in the cavity 13 is cured to form the resin pipe 5. Simultaneously with the forming of the resin pipe 5, the metal flange 2 is fitted to the fixing groove 7 continuous over the entire circumference of the outer circumferential surface of the resin pipe 5 in the circumferential direction, and the outer circumferential surface of the fixing groove 7 is caused to enter the unevenness on the surface of the insertion hole 3. The circumferential rib 9*a* and the longitudinal rib 9*b* described above are formed on at least one side of both ends of the metal flange 2 in the longitudinal direction of the resin pipe 5.

The forming method using the assist gas G as an assist material is employed in the embodiment, but an appropriate material of other gases, liquid, such as water, and a solid, such as a metal ball and a resin ball, can be used as the assist material. The known appropriate mechanism is employed as the assist gas injection unit 14*b* according to the type of the assist material.

To form the resin pipe 5, various known forming methods that do not use an assist material can be employed. For example, in a state in which a core extending in the longitudinal direction of the cavity body is disposed on the cavity body 13*a*, the molten resin R is injected into the cavity 13, and then the core is removed to allow for forming the pipe passage 6 and forming the resin pipe 5.

Figure 15:
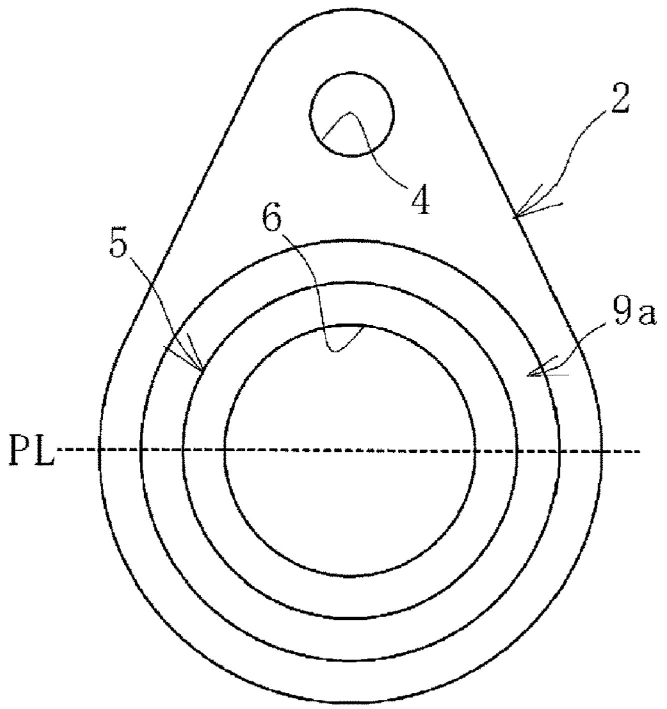
FIG. 15 is an explanatory view exemplifying a parting line of a resin pipe of FIG. 4.
Figure 16:
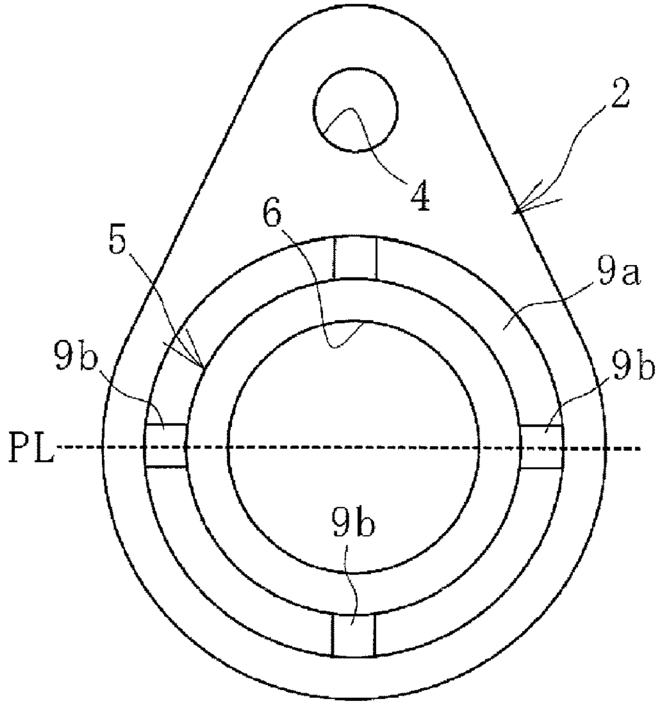
FIG. 16 is an explanatory view exemplifying a parting line of a resin pipe of FIG. 9.

With the resin pipe 5 of a straight pipe, various forming methods can be employed. However, with the resin pipe 5 of a non-straight pipe, a forming method using an assist material is preferably employed. This is because a bent portion of the resin pipe 5 is easily formed by the forming method using the assist material. In the resin pipe 5 of FIG. 4, a dashed line PL exemplified in FIG. 15 serves as a parting line of the mold 12, and in the resin pipe 5 of FIG. 9, the dashed line PL exemplified in FIG. 16 serves as a parting line of the mold 12.

The assembly 1 of the embodiment of the present invention has a structure in which the metal flange 2 is fitted into the fixing groove 7 continuous over the entire circumference of the outer circumferential surface of the resin pipe 5 in the circumferential direction, and the outer circumferential surface of the fixing groove 7 enters the unevenness on the surface of the insertion hole 3. Therefore, it is advantageous to fix the metal flange 2 to the resin pipe 5 at a predetermined position without displacement. In the assembly 1 exemplified in FIGS. 1 to 6, providing the projections 3*a* on the surface of the insertion hole 3 prevents the metal flange 2 from rotating around the resin pipe 5, and the circumferential rib 9*a* and the enlarged-diameter portion 8*c* prevent the metal flange 2 from being displaced in the longitudinal direction of the resin pipe 5.

When the metal flange 2 exemplified in FIG. 7 is used, the projections 3*a* provided on the surface of the insertion hole 3 prevent the metal flange 2 from rotating around the resin pipe 5, and also prevent the metal flange 2 from being displaced in the longitudinal direction of the resin pipe 5. Therefore, by providing the projections 3*a*, it is possible to reduce a burden on the circumferential rib 9*a* and the enlarged-diameter portion 8*c* that prevent the metal flange 2 from being displaced in the longitudinal direction of the resin pipe 5.

Further, since a structure in which the circumferential rib 9*a* integrated with the resin pipe 5 described above is provided on at least one side of both ends of the metal flange 2 in the longitudinal direction of the resin pipe 5 is employed, stress generated in the resin pipe 5 at the fixed portion of the metal flange 2 and the resin pipe 5 is reduced by the circumferential rib 9*a*. As a result, it is possible to suppress the resin pipe 5 from being damaged over time at the fixed portion of both, which is advantageous in improving the durability of the resin pipe 5 (assembly 1).

In particular, a service life of the resin pipe 5 tends to be further short under the condition that a used internal pressure of the resin pipe 5 of 30 MPa or more, but the service life can be extended by applying the embodiment of the present invention. As the resin pipe 5 having the used internal pressure of 3.5 MPa or more (or 30 MPa or more), a pipe through which a refrigerant of an air conditioner mounted on an automobile flows can be exemplified.

The specification of including the above-described longitudinal rib 9*b* in addition to the circumferential rib 9*a* is advantageous in further improving the durability of the resin pipe 5 (assembly 1). Further, when the circumferential ribs 9*a* are connected to both end surfaces of the metal flange 2, it is more advantageous to fix the metal flange 2 at a predetermined position of the resin pipe 5, and it is also advantageous to improve the durability of the resin pipe 5 (assembly 1).

When the resin pipe 5 is too hard, it is disadvantageous to suppress damage over time, and therefore appropriate flexibility is required. Therefore, it is desirable that the resin pipe 5 is formed of, for example, 66 nylon and short fibers are mixed for reinforcement.

REFERENCE SIGNS LIST

- 1 Assembly
- 2 Metal flange
- 3 Insertion hole
- 3*a* Projection
- 4 Mounting hole
- 5 Resin pipe
- 6 Pipe passage
- 7 Fixing groove
- 8 Insertion portion
- 8*a* Seal groove
- 8*b*, 8*c* Enlarged-diameter portion
- 8*d* Seal material (O-ring)
- 9*a* Circumferential rib
- 9*b* Longitudinal rib
- 10 Fixing bolt
- 11 Target device
- 11*a* Flow path
- 12 (12*a*, 12*b*) Mold
- 13 Cavity
- 13*a* Cavity body
- 13*b* Rib forming cavity
- 13*c* Insert portion
- 14 Forming device
- 14*a* Cylinder
- 14*b* Assist gas injection unit
- R molten resin
- G assist gas

The invention claimed is:

1. An assembly of a metal flange and a resin pipe in which the metal flange is externally fitted to and integrated with the resin pipe, the metal flange being fitted in a fixing groove continuous over an entire circumference of an outer circumferential surface of the resin pipe in a circumferential direction, unevenness being formed on a surface of an insertion hole of the metal flange into which the resin pipe is inserted, and an outer circumferential surface of the fixing groove entering the unevenness, a circumferential rib being formed on at least one side of both ends of the metal flange in a longitudinal direction of the resin pipe, abutting on an end surface of the metal flange, having a diameter larger than an outer diameter of the resin pipe, and being continuous over the entire circumference of the outer circumferential surface of the resin pipe in the circumferential direction, and a longitudinal rib connected to the circumferential rib and extending to one side in the longitudinal direction of the resin pipe.

2. The assembly of the metal flange and the resin pipe according to claim 1, wherein at least the three longitudinal ribs are separated at regular intervals in the circumferential direction of the resin pipe.

3. The assembly of the metal flange and the resin pipe according to claim 1, wherein the circumferential rib is formed on the other end side in the longitudinal direction of the resin pipe, abuts on an end surface of the metal flange, has a diameter larger than an outer diameter of the resin pipe, and is continuous over the entire circumference of the outer circumferential surface of the resin pipe in the circumferential direction.

4. A method of manufacturing an assembly of a metal flange and a resin pipe in which the metal flange is externally fitted to and integrated with the resin pipe, the method comprising:

forming unevenness on a surface of an insertion hole of the metal flange into which the resin pipe is inserted;

disposing the metal flange in an insert portion provided in a cavity body of a mold for forming the resin pipe;

forming a rib forming cavity on at least one side of both ends of the insert portion in an extension direction of the cavity body, the rib forming cavity being connected to the insert portion, having a diameter larger than an outer diameter of the cavity body, and being continuous over an entire circumference of an outer circumferential surface of the cavity body in a circumferential direction;

injecting molten resin into the cavity body and the rib forming cavity in a state where the mold is clamped to form the resin pipe by curing the molten resin;

fitting the metal flange into a fixing groove continuous over the entire circumference of the outer circumferential surface of the resin pipe in the circumferential direction;

causing an outer circumferential surface of the fixing groove to enter the unevenness on the surface of the insertion hole; and forming a circumferential rib on at least one side of both ends of the metal flange in a longitudinal direction of the resin pipe, the circumferential rib abutting on an end surface of the metal flange, having a diameter larger than an outer diameter of the resin pipe, and being continuous over the entire circumference of the outer circumferential surface of the resin pipe in the circumferential direction.

5. The method of manufacturing the assembly of the metal flange and the resin pipe according to claim 4, wherein after the molten resin is injected into the cavity body and the rib forming cavity, an assist material is injected into the cavity body filled with the molten resin and the assist material is caused to pass through in the extension direction of the cavity body.

6. The method of manufacturing the assembly of the metal flange and the resin pipe according to claim 5, wherein an assist gas is used as the assist material.

* * * * *